US008837831B2

(12) United States Patent
Raju

(10) Patent No.: US 8,837,831 B2
(45) Date of Patent: Sep. 16, 2014

(54) METHOD AND SYSTEM FOR MANAGING DIGITAL PHOTOS

(75) Inventor: Ruta S. Raju, Bangalore Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/555,815

(22) Filed: Jul. 23, 2012

(65) Prior Publication Data

US 2012/0288201 A1 Nov. 15, 2012

Related U.S. Application Data

(63) Continuation of application No. 11/968,596, filed on Jan. 2, 2008, now Pat. No. 8,254,684.

(51) Int. Cl.
*G06K 9/00* (2006.01)
*H04N 5/445* (2011.01)
*G06Q 30/02* (2012.01)
*G06F 17/30* (2006.01)

(52) U.S. Cl.
CPC .......... *G06F 17/30265* (2013.01); *G06Q 30/02* (2013.01); *G06Q 30/0225* (2013.01); *G06F 17/30256* (2013.01)
USPC ...................... 382/181; 382/100; 348/E5.099

(58) Field of Classification Search
USPC ......... 382/181, 289, 296, 294, 276, 293, 100; 348/E5.099, E5.105; 725/86; 715/700, 715/764, 810; 711/162; 707/E17.019, 707/999.104, E17.009; 701/221, 217
See application file for complete search history.

(56) References Cited

U.S. PATENT DOCUMENTS

| 6,208,387 | B1 * | 3/2001 | Magnusson et al. .......... 348/578 |
| 6,499,016 | B1 * | 12/2002 | Anderson ...................... 704/275 |
| 7,076,496 | B1 * | 7/2006 | Ruizandrade ................. 717/170 |
| 7,415,662 | B2 * | 8/2008 | Rothmuller et al. .......... 715/200 |
| 7,454,077 | B1 * | 11/2008 | MacKenzie et al. .......... 382/250 |
| 7,548,914 | B2 * | 6/2009 | Bell et al. .............................. 1/1 |
| 7,686,682 | B2 * | 3/2010 | Diakopoulos et al. .......... 463/11 |
| 7,734,589 | B1 * | 6/2010 | Svendsen ...................... 707/636 |
| 8,254,684 | B2 * | 8/2012 | Raju ............................. 382/181 |
| 2006/0157551 | A1 * | 7/2006 | Kim et al. ..................... 235/375 |
| 2006/0198559 | A1 | 9/2006 | Manico et al. |
| 2006/0274978 | A1 | 12/2006 | Fukuda et al. |
| 2008/0278438 | A1 * | 11/2008 | Brown et al. ................. 345/156 |

* cited by examiner

*Primary Examiner* — Sheela Chawan
(74) *Attorney, Agent, or Firm* — James J. DeCarlo; Greenberg Traurig, LLP

(57) ABSTRACT

Methods and systems for managing digital photos are disclosed. In one implementation, a method for organizing digital photos includes receiving a set of digital photos, analyzing the set of digital photos to create tags that identify content information in the set of digital photos, tagging the set of digital photos in accordance with their corresponding content information, categorizing the set of digital photos in accordance with their corresponding tags, and displaying the digital photos and their corresponding tags with a display device.

17 Claims, 8 Drawing Sheets

METHOD AND SYSTEM FOR MANAGING DIGITAL PHOTOS

FIELD OF THE INVENTION

The present invention relates to the field of digital photo applications. In particular, the present invention relates to methods and systems for managing digital photos.

BACKGROUND OF THE INVENTION

With the increasing popularity of the Internet and digital photography, the Internet becomes a platform for millions of users to store, print, and share digital photos via various online photo service providers. Yahoo! Flickr (www.flickr.com) is an example of an online photo service provider. The process typically involves taking photos with a digital camera and uploading the digital photos to the online photo service provider's website. From there, a user may view, print, or share the digital photos with friends and family members. Typically, the user would access the online photo service provider's website using a uniform resource locator (URL) and a unique login and password. The user may then manipulate the digital photos, such as create multiple albums, provide image names, send images to friends and family, and provide shared access to certain images. Alternatively, websites may serve as a general repository, for example as a posting website, and anyone using the correct URL would have access to the images.

After hundreds and thousands photos have been uploaded, the categorization and searching of the photos are typically done manually. For example looking a particular person in a photo is done through visual inspection of all the photos or thumbnails of the photos individually and sequentially. Such conventional approach does not provide an efficient way to assist the user to obtain relevant information from the photos.

Therefore, there is a need to address the issues of the conventional system in handling digital photos. In particular, there is a need for methods and systems for managing, organizing, and searching digital photos.

SUMMARY

A photo-tagging application can be a desktop application or a web-based application which can be made available to the users through a service provider's website, such as the Yahoo! website (www.yahoo.com). The current disclosure not only is designed to automate most of the tedious tasks that are involved in uploading and managing photos, it is also able to extract the contents of the photos. Every image tells a story and the photo-tagging application is designed to manage and understand such rich set of information with the help of the user. In addition, the photo-tagging application can allow users to train the system to recognize, retrieve and tag the logos or faces automatically.

Methods and systems for managing digital photos are disclosed. In one embodiment, a method for organizing digital photos includes receiving a set of digital photos, analyzing the set of digital photos to create tags that identify content information in the set of digital photos, tagging the set of digital photos in accordance with their corresponding content information, categorizing the set of digital photos in accordance with their corresponding tags, and displaying the digital photos and their corresponding tags with a display device.

In another embodiment, a method for presenting advertisements associated with digital photos includes providing a set of digital photos, analyzing the set of digital photos to create tags that identify content information in the set of digital photos, providing one or more advertisements in accordance with the content information identified, and displaying the set of digital photos and their corresponding advertisements with a display device.

In yet another embodiment, a computer program product for organizing digital photos includes a medium storing executable program code. The computer program product includes code for receiving a set of digital photos, code for analyzing the set of digital photos to create tags that identify content information in the set of digital photos, code for tagging the set of digital photos in accordance with their corresponding content information, code for categorizing the set of digital photos in accordance with their corresponding tags, and code for displaying the digital photos and their corresponding tags with a display device.

In yet another embodiment, a system for searching digital photos includes at least one processing unit for executing computer programs that receive a set of digital photos, a graphical-user-interface for viewing representations of the set of digital photos on a display, and a memory for storing the set of digital photos. The system further includes logic for analyzing the set of digital photos to create tags that identify content information of the set of digital photos, logic for tagging the set of digital photos in accordance with their corresponding content information, logic for searching the digital photos according to the tags associated with the photos, and logic for storing search results in the memory.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DESCRIPTION OF EMBODIMENTS

Methods and systems are provided for managing digital photos. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
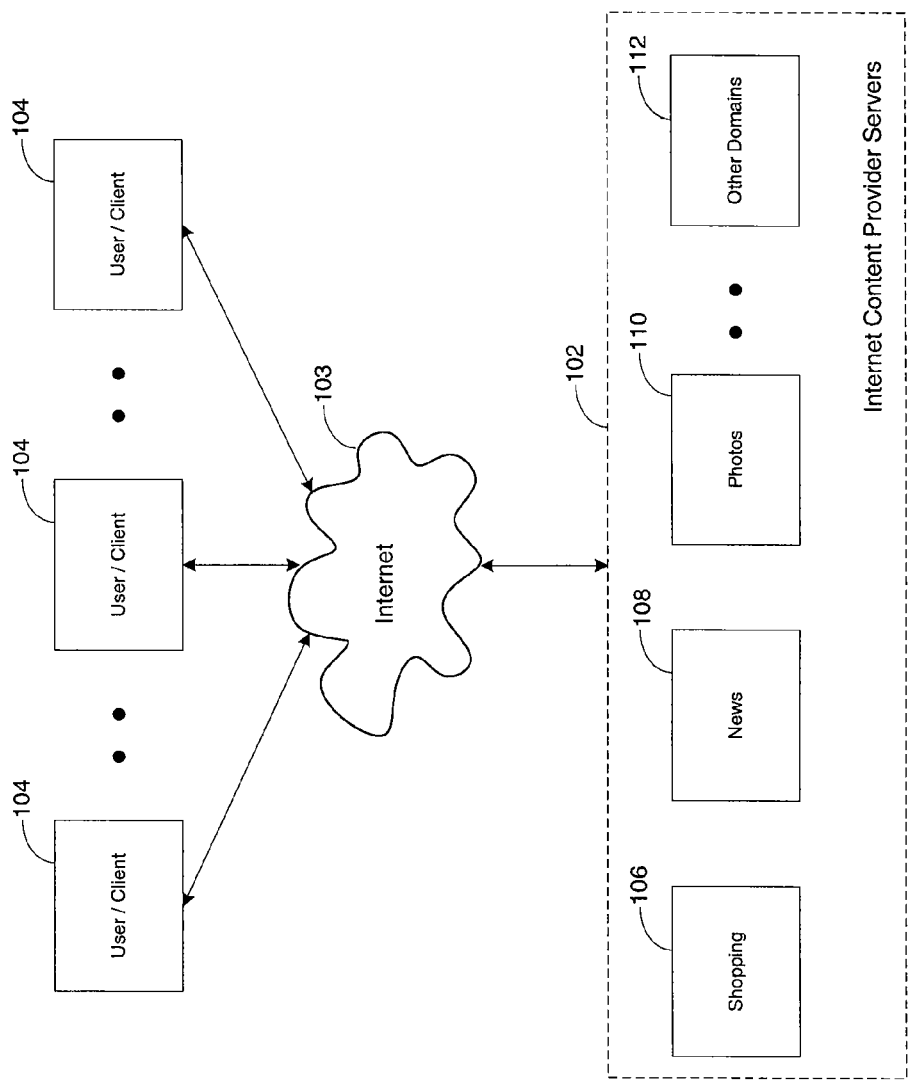
FIG. 1 illustrates a system for managing digital photos according to an embodiment of the present invention.

FIG. 1 illustrates a system for presenting photos on a website within a browser according to an embodiment of the present invention. The system includes one or more Internet content provider servers 102, and one or more clients 104. The servers 102 interface with the clients 104 via the Internet 103. The servers further include a plurality of individual domains, for example, shopping domain 106, news domain 108, photos domain 110 and other domains 112. A domain is a computer system implemented with different hardware and software for a specific application, such as the shopping applications, news applications, and photo applications. The photo applications of the present invention are run on the photos domain 110, which implements Web 2.0 functionalities using a combination of HTML, CSS, JavaScript and "Asynchronous JavaScript and XML" (AJAX).

In particular, JavaScript is used to create, monitor, change and destroy objects and change the state of various photo-related objects, in addition to keeping track of browser behavior changes initiated by the user. For example, when a user starts dragging an original thumbnail image in the browser window, the browser fires "mouse down" and "mouse move" events, which are captured by the JavaScript, and an object is created to handle the event. The object is effectively a copy of the original thumbnail image, and the copy of the image is being moved around. When the object is put into the tray, it is added to the tray controller object, which monitors this new object being added to it and continues to keep track of the object. Similarly, when the user drags a thumbnail image and removes the image from the display, the browser fires "mouse down," "mouse move," and "mouse up" events, which are captured and result in the removal of the item from display. In other words, each object has states, and such states are created and modified in response to user initiated changes (events) to the browser behavior.

As described above, the process of monitoring and updating states of an object is event driven. When a user performs a specific action, JavaScript that runs in the background determines the exact browser event that has been initiated according to a set of user cases. For example, if the user clicks outside of a photo and drags, that action is interpreted as the intent to draw a selection rectangle. Similarly, if the user clicks directly on an image and starts to move by a distance greater than about five pixels, that action is interpreted as a drag. Then, the JavaScript starts to monitor the mouse movement and attaches the thumbnail images to the cursor at that point. While moving the cursor, the JavaScript updates the attached images' positions and waits for the user to release the image. Upon the images being released, the JavaScript determines the location of the cursor within the browser window. If the images are moved to an invalid drop target, a reset action is initiated and the images are snapped back to their original locations. While the user is dragging thumbnail images, the JavaScript monitors where the cursor is, and determines whether it is over a valid drop target or an invalid drop target. In the case that the cursor is over a valid drop target, the JavaScript would cause the valid drop target to be highlighted, providing a positive feedback to the user. When the cursor moves out of the valid drop target, the JavaScript would deactivate the highlighted area. This series of events is also referred to as the "hover" effect.

Once the application is opened, a user may either plug in a camera to upload the photos or browse through the desktop to load in the photos. The application may support a plug-and-play feature that automatically identifies the make and the model of the camera, and uses metadata received from the camera to tag the photos uploaded from the camera. In other embodiments, the photos may be uploaded from a handheld device, such as a portable computer, personal digital assistant (PDA), a cellular phone, or a MP3 player, etc.

Figure 2:
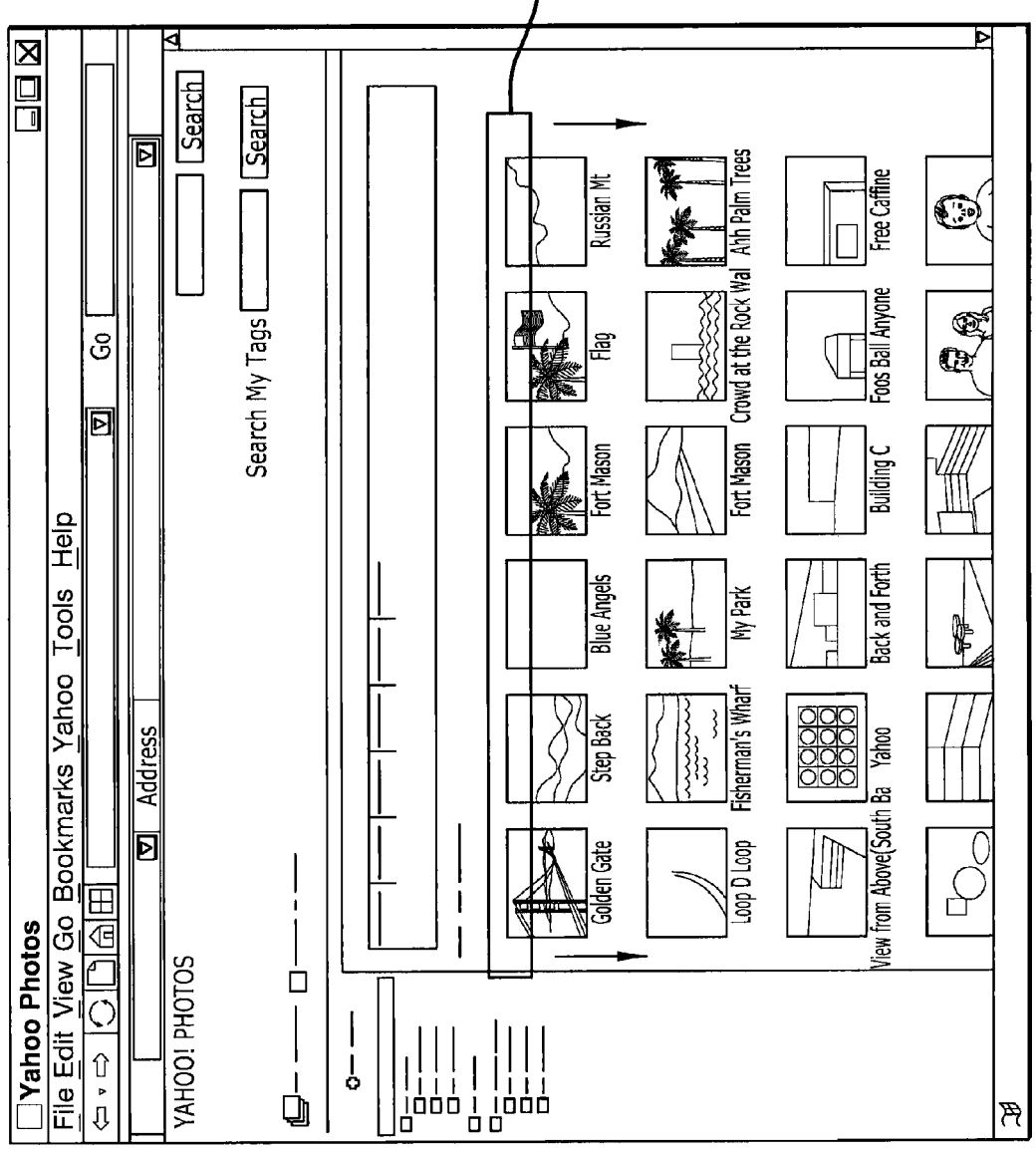
FIG. 2 illustrates a method for analyzing photo contents automatically according to embodiments of the present invention.

After the digital photos are loaded to the photo-tagging application, the application analyzes contents of the photos by scanning the photos. FIG. 2 illustrates a graphical representation of a scanning operation according to an embodiment of the present invention. As shown in FIG. 2, the rectangle 202 represents the area the photos being scanned, and the arrows indicate the direction of the scan operation. During the scan operation, the application performs content analysis of the photos, and identifies objects and content information of each photo. For example, the scan operation identifies human faces, monuments, buildings, sceneries, logos, text, etc. from the photos. Note that the scanning operation may be performed on a group of photos one at a time or on multiple photos simultaneously as shown in FIG. 2.

Figure 3A:
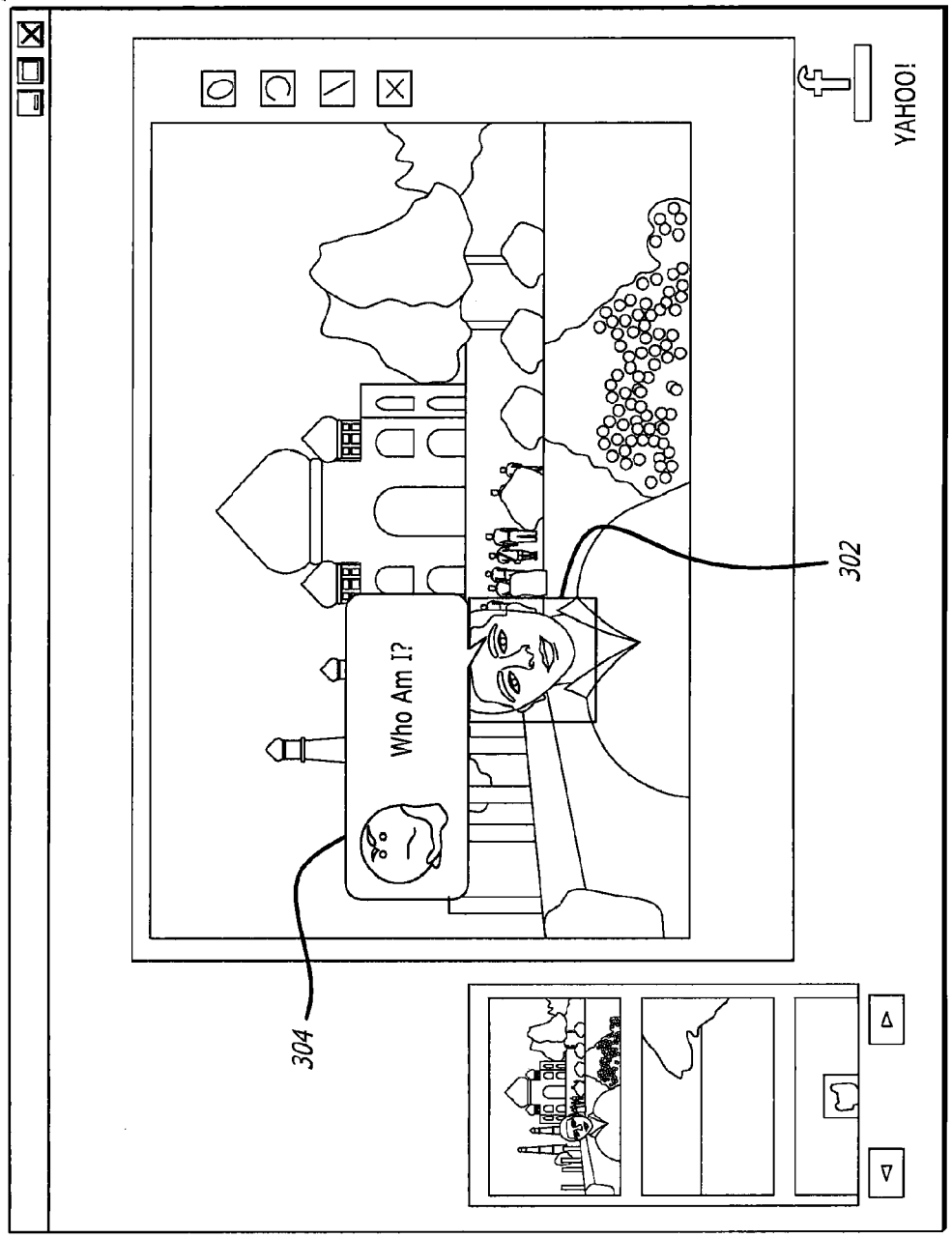
FIGS. 3A-3C illustrate methods for identifying objects in photos according to embodiments of the present invention.
Figure 3B:
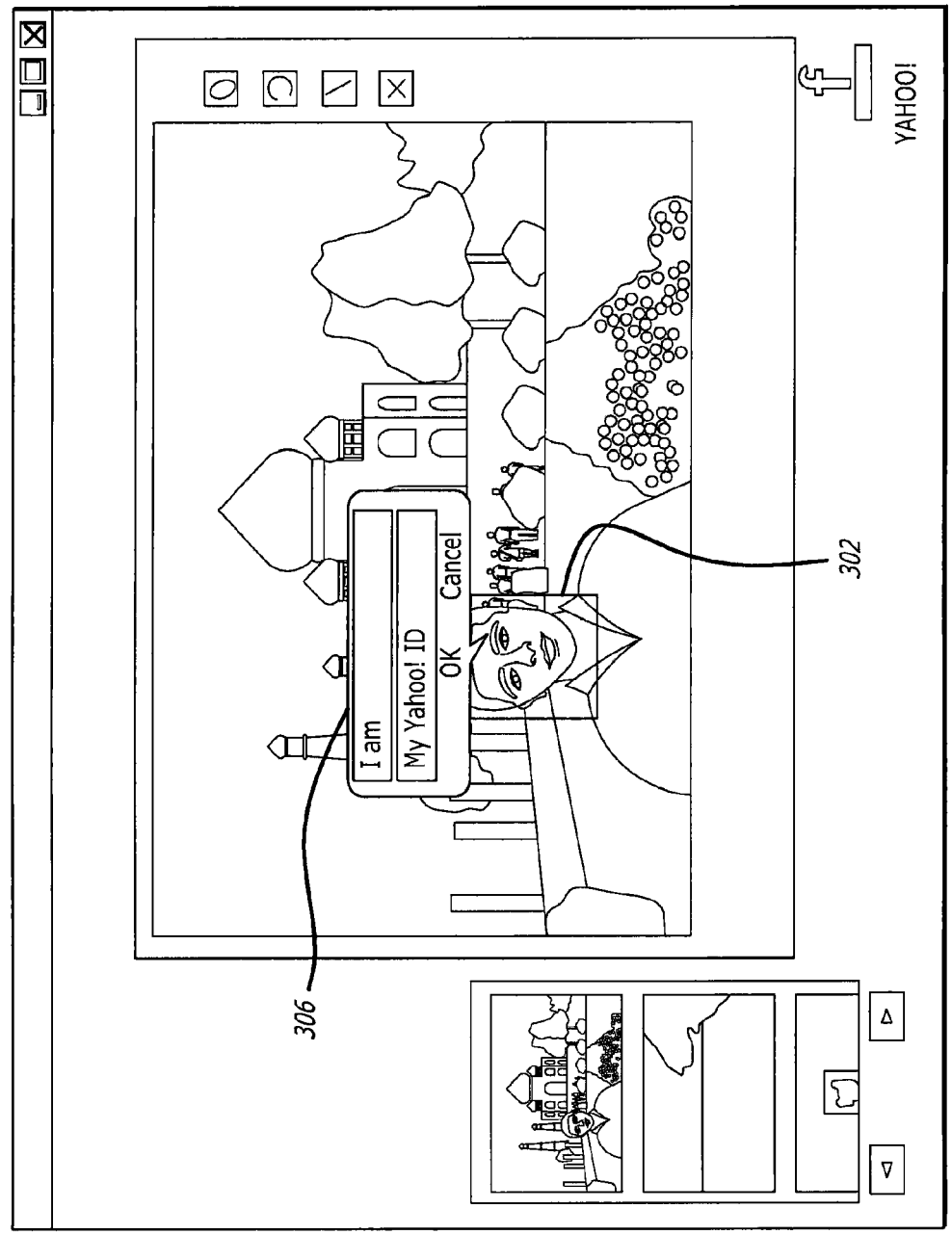
Figure 3C:
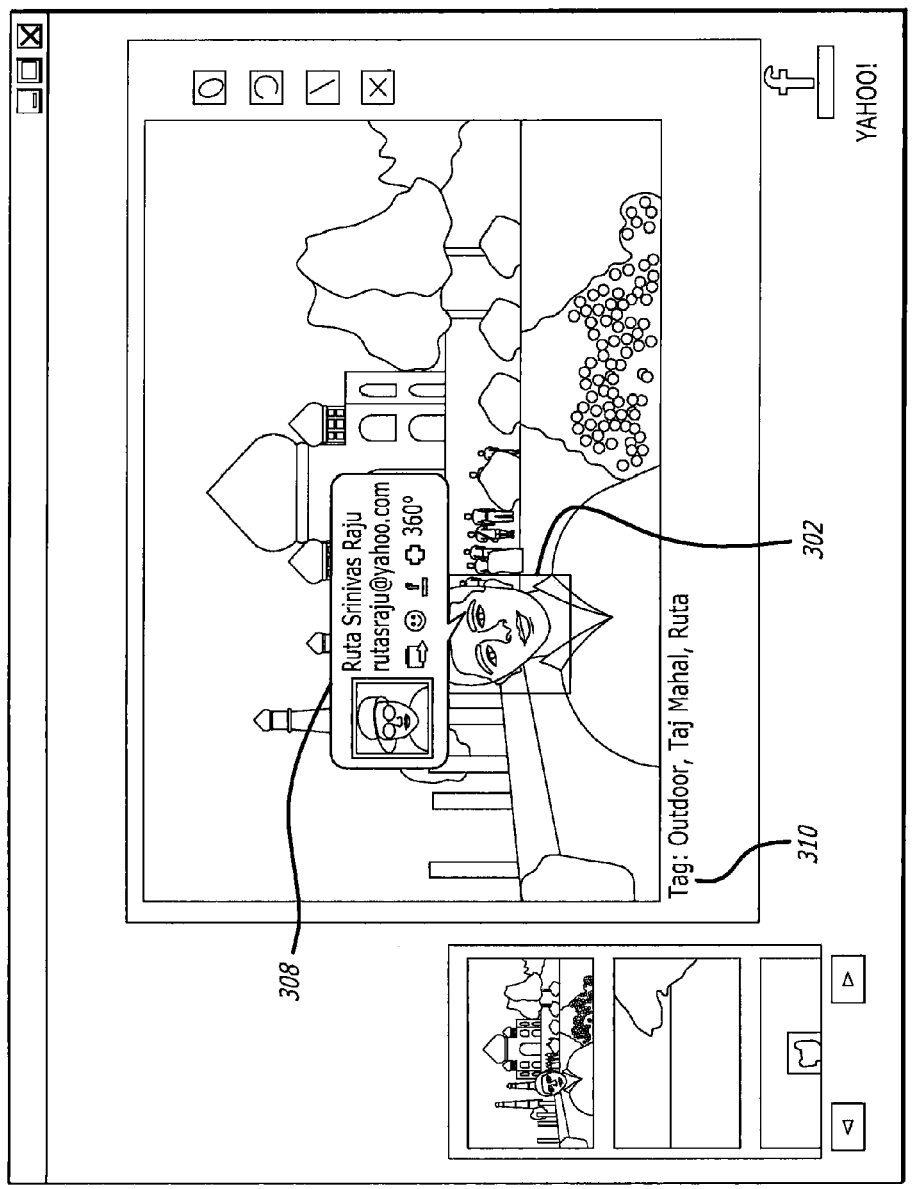

In various embodiments of the present invention, the photo-tagging application may be trained to identify a specific object in which the user is interested, and subsequently allow the user to retrieve photos that contain that specific object. FIGS. 3A-3C illustrate a method for tagging an object according to embodiments of the present invention. In this case, the object the user specified may be the face of a friend, a member of her family, or a celebrity.

In the example of FIG. 3A, when the scanning operation detects a face 302 in the picture, the application provides an inquiry (dialog box) 304 "Who Am I?" to allow the user to enter information about the person in the photo. This is one of the approaches to train the application to recognize a particular person in a photo. In this case, the user may click on the dialog box 304 to enter information about the person in the photo. FIG. 3B shows an updated dialog box 306 that presents two data fields for the user to enter information. In the "I am" field, the user may enter a name of the person. In the "My Yahoo! ID" field, the user may enter a user ID or an email address. After the information is entered, the user may click the "Ok" to save or may click "Cancel" to cancel the information entered. FIG. 3C shows an example of the information about the person in the photo entered by the user in box 308. In this case, the name is "Ruta Srinivas Raju" and the user ID is rutasraju@yahoo.com. A person skilled in the art would appreciate that different data fields may be presented in the dialog box, and other information about the person in the photo may be collected. After the information is entered, a tag 310 at the bottom of the photo displays an example of the information being tagged to this photo, namely "outdoor, Taj Mahal, Ruta," which indicates that this is an outdoor photo, the background is Taj Mahal, and the person in the photo is Ruta. In some embodiments of the present invention, the user may 1) email this photo to someone by clicking on the envelope icon; 2) pull the Yahoo! Avatar of the person by clicking on the face icon; 3) link to the person's Yahoo! Flickr (www- .flickr.com) account by clicking on the "f" icon; or 4) link to the persons social networking page (http://360.yahoo.com) by clicking on the "+360°" icon.

As shown in the examples above, a photo that contains a particular face may be tagged with an identifier that identifies that face. Subsequent to the tagging of the photos, the user may search the photos to find information about which the user is interested. For example, after the photos are tagged with identifiers that identify the contents of the photos, whenever the user wants to see photos that contain a friend named Ruta, the user may type in the keyword Ruta in the search box and the application may return search result containing photos that have Ruta in them.

In the embodiments of FIGS. 3A-3C, a face detection technique is employed by the photo-tagging application. In general, the face detection technique may be regarded as a specific case of object-class detection. In object-class detection, the task is to find the locations and sizes of all objects in an image that belong to a given class. Examples include upper torsos, pedestrians, and cars. Face detection may also be regarded as a more general case of face localization. In face localization, the task is to find the locations and sizes of a known number of faces. In face detection, one does not have this additional information. Some face-detection algorithms may focus on the detection of frontal human faces, whereas other face-detection algorithms may attempt to solve the more general and difficult problem of multi-view face detection. That is, the detection of faces that are either rotated along the axis from the face to the observer (in-plane rotation), or rotated along the vertical or horizontal axis (out-of-plane rotation), or both.

According to embodiments of the present invention, a face-detection algorithm may implement the face-detection task as a binary pattern-classification task. In this approach, the content of a given part of an image is transformed into features, after which a classifier trained on example faces decides whether that particular region of the image is a face, or not. Often, a window-sliding technique is employed. For example, a classifier is used to classify the (shown as a square or rectangular) portions of an image, at all locations and scales, as either faces or non-faces (background pattern).

One of the challenges in pattern classification for face detection is that a given natural image often contains many more background patterns than face patterns. In some situations, the number of background patterns may be many times larger than the number of face patterns. This means that if a high face-detection rate combined with a low number of false detections in an image is desired, a very specific classifier may be needed. One approach is to use a rough guideline that a classifier should yield a high detection rate (for example over 90%), combined with a low false-positive rate (for example in the order of $10^{-6}$). A person skilled in the art would understand that other face-detection techniques, such as those used in biometrics, video surveillance, human computer interface, digital photograph, and image database management, may be employed in the present invention.

In another application, the photo-tagging application may be trained to identify certain well known monuments and buildings. With this capability, when a well known monument or building is presented in the photos, for example the Taj Mahal 402 as shown in FIG. 4, the application may be able to find it and tag the photo with relevant key words that describe the well known monument or building automatically.

Figure 4:
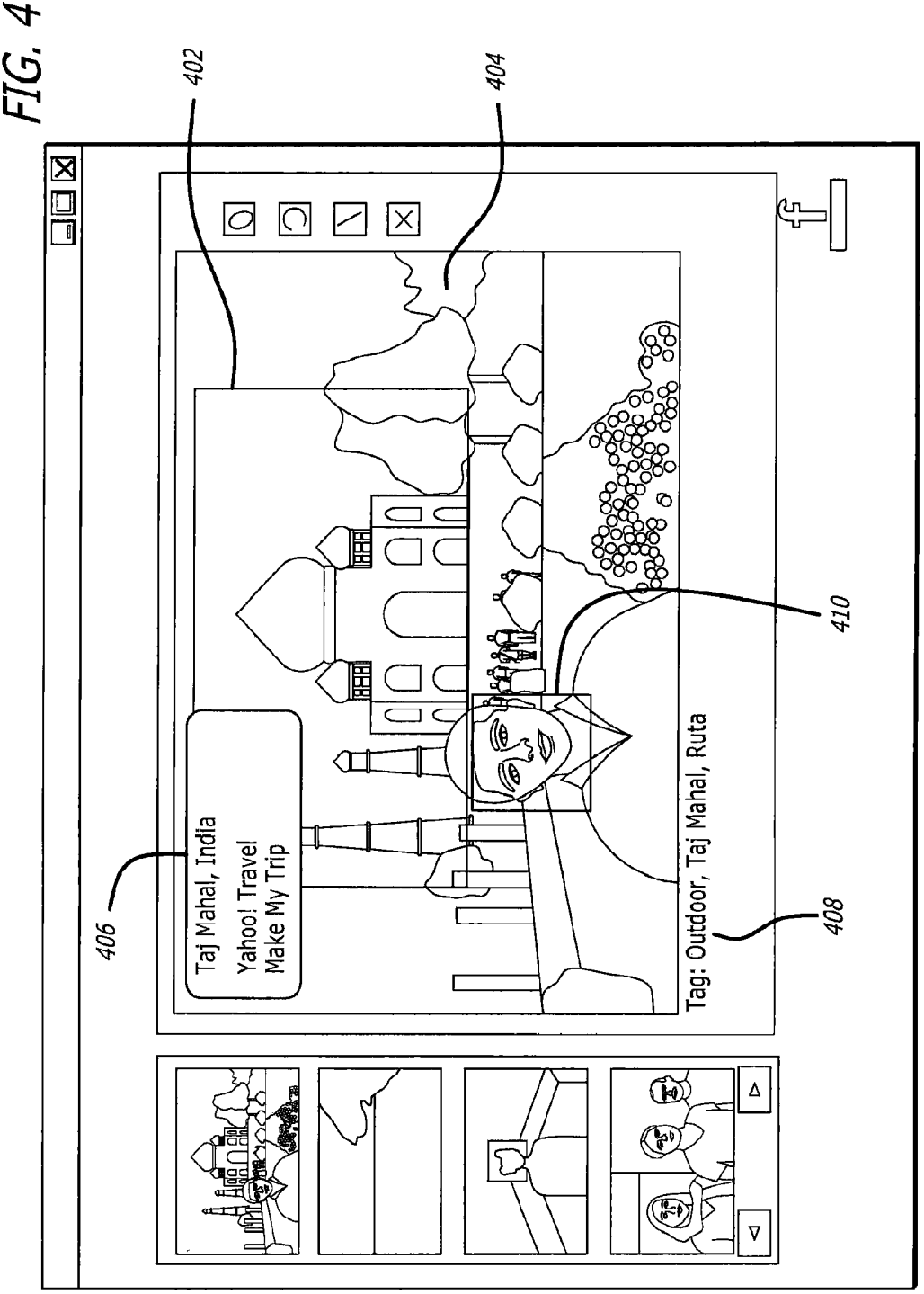
FIG. 4 illustrates a method for tagging particular information in a photo according to an embodiment of the present invention.

FIG. 4 illustrates an example for tagging a well known monument according to an embodiment of the present invention. In this example, the photo-tagging application detects Taj Mahal in photo 404. It may display a pop-up window 406 automatically indicating to the user that the monument recognized is "Taj Mahal, India." Subsequently, a tag 408 may be generated to indicate "Taj Mahal" as one of its keywords.

In addition, as shown in FIG. 4, after a monument or a point of interest is identified, the photo-tagging application may display related products or advertisements. For example, a link may be displayed to link the user to the Yahoo! travel website to assist the user to make travel arrangements for visiting the identified monument or point of interest.

In yet another application, the photo-tagging application may be trained to identify a certain location or building defined by the user. For example, the user may train the Photo-tagging application to identify his house by using multiples images of his house through various angles and perspectives. After the photo tagging application has been trained, the user may search for photos that show his house. In response to the search, the search result would include houses that are tagged as the user's house.

In yet another application, the photo-tagging application may be trained to identify people's faces and tag them automatically. As shown in FIG. 4, a face 410 may be tagged with the name "Ruta" which is shown in the tag 408. In another approach, the user may edit the tag assigned by the photo-tagging application.

Figure 5:
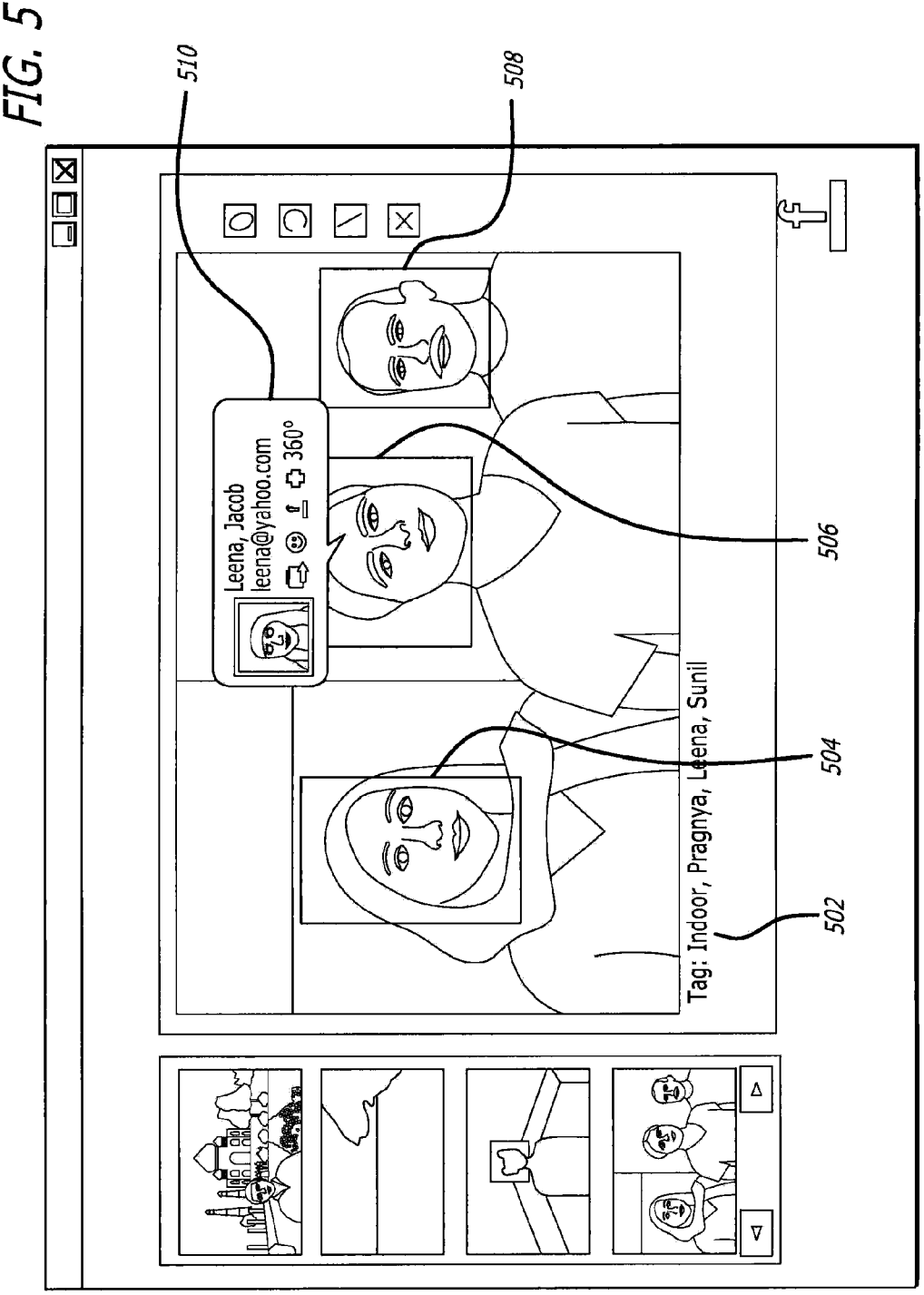
FIG. 5 illustrates a method for smile detection according to an embodiment of the present invention.

The photo-tagging application may implement a smile detector which can detect people's smiling faces. In FIG. 5, the faces of three people are detected and identified as items 504, 506, and 508 respectively. An automatically generated tag indicates the photo is an indoor picture, and the names of the three people are Pragnya, Leena, and Sunil respectively. In this example, Leena Jacobs has a smile face, this information is captured by the pop-up window 510.

Figure 6:
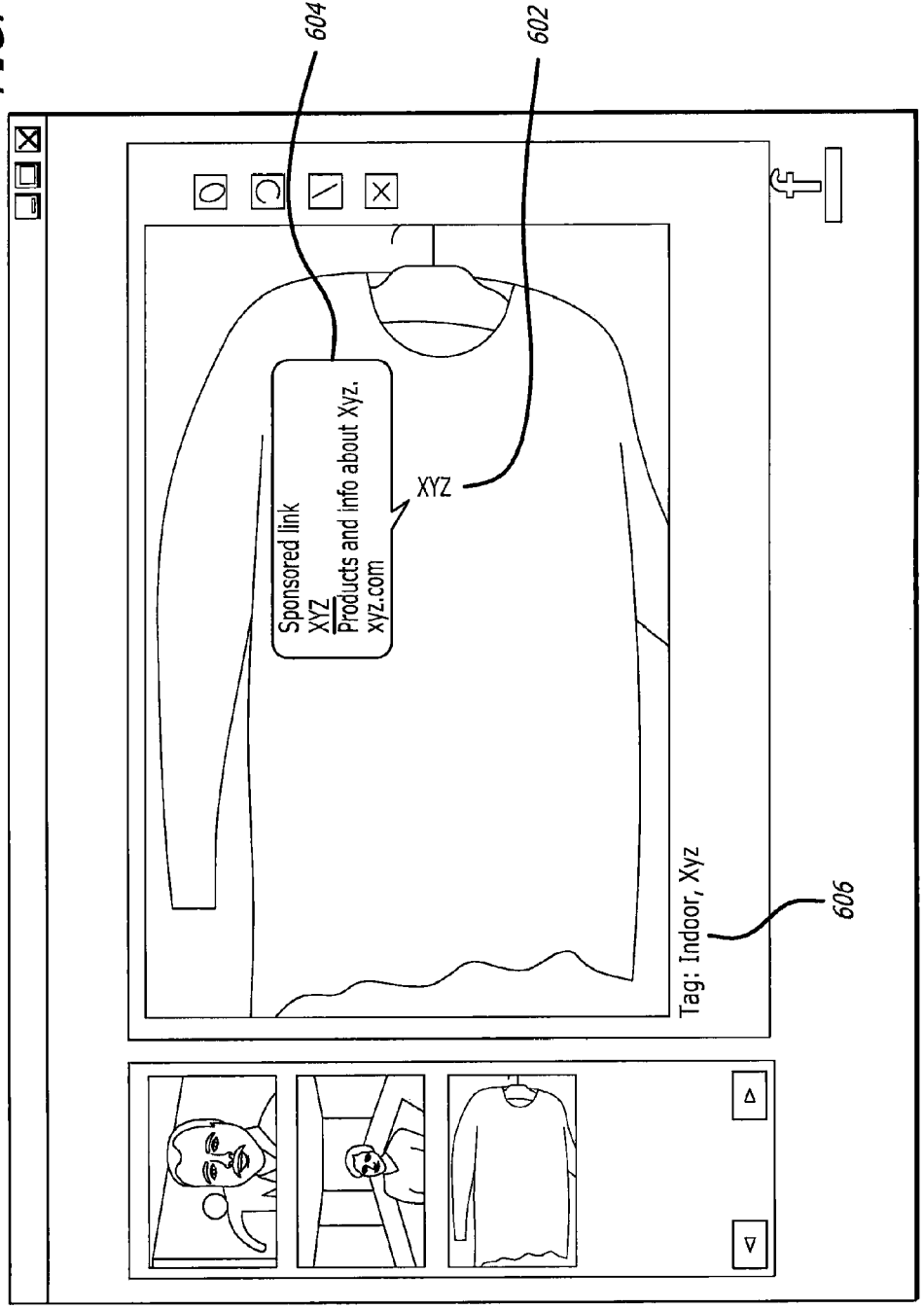
FIG. 6 illustrates a method for tagging logos in a photo according to an embodiment of the present invention.

In yet another application, the photo-tagging application may be applied to recognizing text from photos. As shown in the example of FIG. 6, the application may recognize and read the text XYZ 602 that is available in the photos. In response to the content of the text recognized, relevant advertisements may be shown along with the photos. The pop-up window 604 may further include a link to the sponsor's website. Similarly, the application may be applied to recognize trademarks or logos from the photos. In this case, after recognizing a trademark or logo, a link to the company website or an advertisement of the company's products may be displayed along with the photo.

According to embodiments of the present disclosure, content-based image retrieval (CBIR) technique, also known as query by image content (QBIC) technique, and content-based visual information retrieval (CBVIR) technique may be applied to recognize text, logo, icon, trademark, or a user defined pattern from photos. In content-based image retrieval, the search analyzes the actual contents of the image. The term content in this context may refer to colors, shapes, textures, or any other information that can be derived from the image itself. Without the ability to examine image content, searches must rely on metadata such as captions or keywords.

Different implementations of CBIR make use of different types of user queries. For instance, query by example is a query technique that involves providing the CBIR system with an example image that it will then base its search upon. The underlying search algorithms may vary depending on the application, but result images would all share common elements with the provided example.

Note that options for providing example images to the system may include: 1) a preexisting image being supplied by the user or chosen from a random set; 2) the user draws a rough approximation of the image he is looking for, for example with blobs of color or general shapes. This query technique removes the difficulties that can arise when trying to describe images with words.

An example of a system that allows users to draw their search criteria is described below. The CBIR system from a user perspective may involve what is referred to as semantic retrieval, where the user makes a request like "find pictures of dogs" or even "find pictures of Abraham Lincoln." This type of open-ended task may be challenging for computers to perform because pictures of Chihuahuas and Great Danes look very different, and Lincoln may not always be facing the camera, or in the same pose. Some CBIR systems therefore generally make use of lower-level features like texture, color, and shape, although some systems take advantage of very common higher-level features like faces. Note that not every CBIR system is generic, and some systems may be designed for a specific domain, for example shape matching can be used for finding parts inside a CAD-CAM database. Also note that other query methods include specifying the proportions of colors desired, such as 80% red and 20% blue, and searching for images that contain an object given in a query image.

CBIR systems can also make use of relevance feedback, where the user progressively refines the search results by marking images in the results as "relevant," "not relevant," or "neutral" to the search query, then repeating the search with the new information. The sections below describe some methods for extracting content from images so that they can be easily compared. The methods outlined below are used to implement content comparison techniques.

First, examining images based on the colors they contain is a widely used technique because it does not depend on image size or orientation. Color searches usually involve comparing color histograms, though this is not the only technique in practice. Next, texture measures look for visual patterns in images and how they are spatially defined. Textures are represented by texture elements in such a way that they are placed into a number of sets, depending on how many textures are detected in the image. These sets not only define the texture, but also where in the image the texture is located. In addition, shape does not refer to the shape of an image but to the shape of a particular region that is being sought out. Shapes may be determined first by applying segmentation or edge detection to an image. In some cases, accurate shape detection may also be implemented using human intervention in addition to being completely automated.

As shown in the paragraphs above, the photo-tagging application allows the user to better 1) understanding the mood of the photo through face recognition and smile detection; 2) understand the content of the photos through searching for text, logo, icon, trademark, and patterns. In addition, the photo-tagging application generates information more relevant to the user about the photos by providing targeted advertisement based on the content of a photo. Moreover, the photo-tagging application provides user access to content, feature, service, or business information through photos.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method comprising:
   associating, by a computer, a digital photo with a user;
   scanning the digital photo to identify content information associated with the digital photo;
   in response to the scanning, obtaining additional information associated with the digital photo from the user;
   tagging, by the computer, the digital photo in accordance with the content information and the additional information; and
   linking, by the computer, the digital photo with a social networking page associated with the user.

2. The method of claim 1, wherein the associating the digital photo with the user further comprises receiving, by the computer, the digital photo from a client device operated by the user.

3. The method of claim 1, wherein the tagging of the digital photo further comprises receiving a tag from the user.

4. The method of claim 1, further comprising causing, by the computer, the digital photo and its corresponding tag to be displayed by a display device.

5. The method of claim 1, further comprising assigning a category to the digital photo in accordance with its corresponding tag.

6. A computing device comprising:
   a processor;
   a storage medium for tangibly storing thereon program logic for execution by the processor, the program logic comprising:
      associating logic executed by the processor for associating a digital photo with a user;
      scanning logic executed by the processor for scanning the digital photo to identify content information associated with the digital photo;
      obtaining logic executed by the processor for obtaining, in response to the scanning, additional information associated with the digital photo from the user;
      tagging logic executed by the processor for tagging the digital photo in accordance with the content information and the additional information; and linking logic executed by the processor for linking the digital photo with a social networking page associated with the user.

7. The computing device of claim 6, wherein the tagging logic for tagging the digital photo further comprises receiving logic for receiving a tag from the user.

8. The computing device of claim 6, further comprising categorizing logic for assigning a category to the digital photo in accordance with its corresponding tag.

9. The computing device of claim 6, further comprising display logic for causing the digital photo and its corresponding tag to be displayed by a display device.

10. A method comprising:
   storing, by a computing device in memory, a digital photo;
   causing, by the computing device, the digital photo to be displayed on a display device;
   identifying, by the computing device, an object in the digital photo, wherein the identifying of the object further comprises identifying a monument or point of interest;
   causing, by the computing device, a product or advertisement associated with the identified object to be displayed on the display device, and
causing, by the computing device, a link to a travel website to be displayed to assist a user in making travel arrangements for visiting the monument or point of interest.

11. The method of claim 10, wherein the causing of the product or advertisement associated with the identified object to be displayed further comprises causing a link to a web page associated with the identified object to be displayed.

12. The method of claim 10, wherein the identifying of the object further comprises identifying a specific location or building defined by the user.

13. The method of claim 12, further comprising receiving, from the user, training to identify the specific location or building.

14. A computing device comprising:
a processor;
a storage medium for tangibly storing thereon program logic for execution by the processor, the program logic comprising:
   storing logic executed by the processor for storing a digital photo;
   display logic executed by the processor for causing the digital photo to be displayed on a display device;
   identifying logic executed by the processor for identifying an object in the digital photo, wherein the identifying logic further comprises identifying logic for identifying a monument or point of interest;
   advertising logic executed by the processor for causing a product or advertisement associated with the identified object to be displayed on the display device;
   linking logic executed by the processor for causing a link to a travel website to be displayed to assist a user in making travel arrangements for visiting the monument or point of interest.

15. The computing device of claim 14, wherein the advertising logic for causing the product or advertisement associated with the identified object to be displayed further comprises linking logic for causing a link to a web page associated with the identified object to be displayed.

16. The computing device of claim 14, wherein the identifying logic further comprises identifying logic for identifying a specific location or building defined by the user.

17. The computing device of claim 16, further comprising receiving logic for receiving, from the user, training to identify the specific location or building.

\* \* \* \* \*